United States Patent [19]

Becker

[11] Patent Number: 5,797,684
[45] Date of Patent: Aug. 25, 1998

[54] VIBRATION DAMPING APPARATUS HAVING AN OIL SPACE WITH AN OUTFLOW CHOKE

[75] Inventor: Karl Helmut Becker, Schwabhausen, Germany

[73] Assignee: MTU Motoren-und Turbinen-Union München GmbH, München, Germany

[21] Appl. No.: 925,957

[22] Filed: Sep. 9, 1997

[30] Foreign Application Priority Data

Sep. 12, 1996 [DE] Germany .............. 196 37 116.3

[51] Int. Cl.$^6$ ................................................. F16C 27/00
[52] U.S. Cl. ................................................. 384/99
[58] Field of Search ................ 384/99, 535, 581

[56] References Cited

U.S. PATENT DOCUMENTS

| | | | |
|---|---|---|---|
| 3,456,992 | 7/1969 | Kulina | 384/99 |
| 4,947,639 | 8/1990 | Hibner et al. | 384/99 X |
| 5,106,208 | 4/1992 | Bobo et al. | 384/99 |
| 5,149,206 | 9/1992 | Bobo | 384/99 |
| 5,197,807 | 3/1993 | Kuznar | 384/99 |
| 5,228,784 | 7/1993 | Bobo | 384/99 |
| 5,316,391 | 5/1994 | Monzel | 384/99 |
| 5,344,239 | 9/1994 | Stallone et al. | 384/99 |

FOREIGN PATENT DOCUMENTS

| | | |
|---|---|---|
| 2264605 | 8/1974 | Germany . |
| 4019720 | 1/1992 | Germany . |

OTHER PUBLICATIONS

Cunningham, R.E., et al. "Design Systems" *NASA Technical Note*. NASA TN D-7892—Feb. 1975.

*Primary Examiner*—Thomas R. Hannon
*Attorney, Agent, or Firm*—Ladas & Parry

[57] ABSTRACT

Apparatus for vibration damping a rotor rotatably supported in a stationary housing by a bearing whose retainer housing is concentrically engaged in the stationary housing in an axial position by elastic elements. In order to avoid or reduce vibrations produced by rotation of the rotor particularly resonance vibrations, an oil space is formed between the stationary housing and the bearing retainer which is sealed at its ends by axially spaced sealing rings. An inlet channel is provided in the stationary housing for supplying oil under pressure into the space and outlet channels for the oil are formed in the bearing retainer in the vicinity of the sealing rings. The oil discharge channels are provided with constricted regions whose flow cross-sections and lengths are related to the flow cross-section of the oil inlet channel such that the oil discharge channels act as chokes or throttles.

9 Claims, 1 Drawing Sheet

5,797,684

VIBRATION DAMPING APPARATUS HAVING AN OIL SPACE WITH AN OUTFLOW CHOKE

FIELD OF THE INVENTION

The invention relates to apparatus for damping vibration of a rotor which is mounted in a bearing supported in a stationary support housing and particularly for damping the retainer or housing of the bearing in the support housing. The bearing housing is concentrically supported in the support housing and is axially positioned therein by resilient means such that a narrow space is formed between opposed circumferential surfaces of the bearing housing and the support housing, the space being sealed at its opposite axial ends by sealing rings between the bearing and support housings. The support housing has a bore serving as an inlet for a viscous liquid, such as oil, said bore communicating with said space between said sealing rings, said bearing housing having bores which communicate with said space in the region of the sealing rings for discharge of the oil from the space.

BACKGROUND AND PRIOR ART

A vibration damping apparatus of the above type is disclosed in U.S. Pat. No. 3,456,992.

High speed rotors are found, for example, in turbojet drive mechanisms where the speed of the rotor can vary from low speeds up to 20,000 rpm.

Due to the unavoidable production of an unbalanced mass of the rotor in its manufacture, the axis of the rotor undergoes vibrating movements which deviate from an ideal axis of rotation. The amplitudes of vibration can reach extreme values, if the rotor approaches the resonance speed. In order to avoid this, it is necessary to keep the resonance speed far from the region of the operating speeds.

Since the resonance speed is dependent on the rigidity of the mounting of the rotor, the resonance speed can be influenced by varying this rigidity. Thus, it is known from U.S. Pat. No. 3,456,992 to elastically support the bearing retainer from the stationary housing and to provide a vibration-damping oil space between the stationary housing and the bearing retainer. An oil squeeze film is formed in the space by means of corresponding oil inlet and discharge channels, and the film counteracts the unbalanced mass as a damping system in cooperation with the resilient support of the bearing retainer so that the resonant frequency and the harmonics of the rotating system are far from the operating speeds.

A certain pressure as well as through-flow of the oil in the oil space is essential for the function of the oil squeeze film. In U.S. Pat. No. 3,456,992, the oil space is limited and sealed by means of two sealing rings disposed in annular cavities and spaced axially from one another, whereby the oil that is introduced through a central oil inlet channel is discharged unhindered through oil discharge channels formed in the annular cavities. Since the oil pressure is adjusted by means of a valve only at the inlet side, a large axial length is necessary in order to counteract a large pressure drop at the edges of the oil squeeze film. A further disadvantage is that the oil inlet and discharge channels are disposed at the same angular position on the surfaces of the bearing and stationary housings so that it is not possible to obtain an oil flow distributed uniformly in the oil space over the periphery of the housings.

SUMMARY OF THE INVENTION

An object of the invention is to provide a vibration damping apparatus of the type given above, in which vibration damping is assured for rotors of small structural length while also providing a uniform oil flow in the oil space.

In accordance with the invention, the discharge bores in the bearing housing have constricted regions therein in the vicinity of the sealing rings, the constricted regions each having a flow cross-section and length related to the flow cross-section of the inlet bore in the stationary housing to constitute a choke.

It is important that the choke effect of the constricted regions in the oil discharge bores have the dominant effect compared to the cross-section of the inlet bore, so that the pressure drop at the outlet bores is reduced and also can be determined in the axial direction in the oil space. Finally, a thermal separation between the rotor and the stator is also assured by means of the assured oil flow. In order to optimally utilize the entire oil space over its axial extent, the oil discharge bores are formed at the axial ends of the space, in the region of the sealing rings, for example, in the sealing ring itself or in the annular cavity. The connection at the discharge bores to the annular cavities has the advantage of providing a more uniform oil pressure distribution in the space, whereas forming bores in the sealing rings would be simpler to manufacture.

BRIEF DESCRIPTION OF THE FIGURES OF THE DRAWING

A preferred embodiment of the invention is described hereafter with reference to the attached drawing, in which.

DETAILED DESCRIPTION OF A PREFERRED EMBODIMENT

Figure 1:
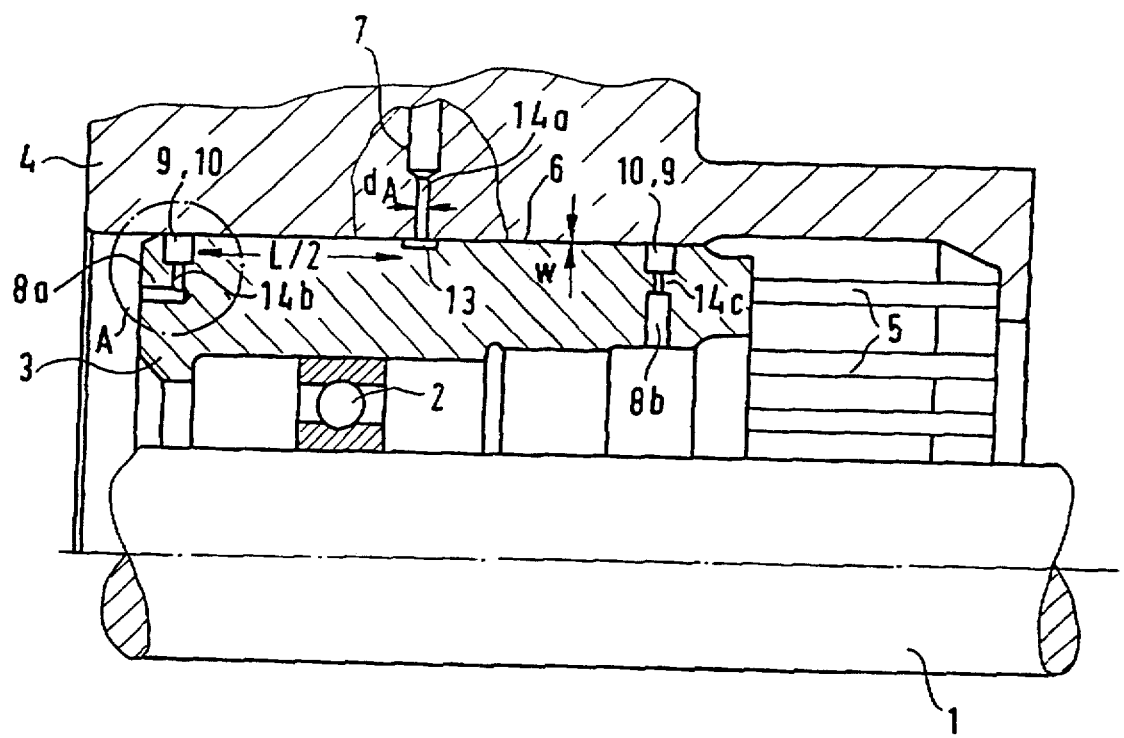
FIG. 1 is a longitudinal, sectional view showing a vibration damping system of the invention for a rotor shaft of a gas turbine drive mechanism.
Figure 2:
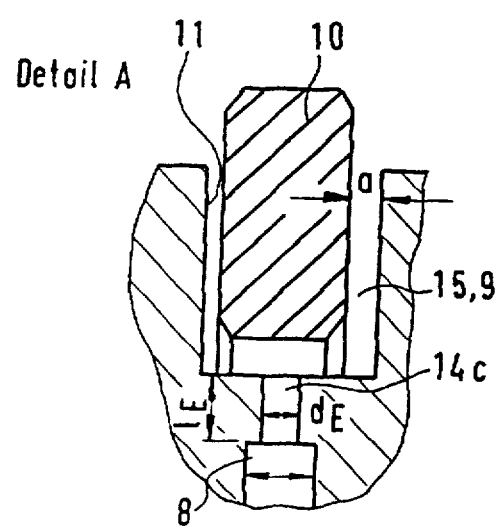
FIG. 2 is an enlarged view of a detail of the damping system illustrated in FIG. 1.

FIG. 1 shows a rotor shaft 1 of a gas turbine drive mechanism (not otherwise shown), the shaft 1 connecting the high pressure turbine of the turbine drive mechanism with the high pressure compressor thereof. The rotor shaft is rotatably mounted in a ball bearing assembly 2 having a bearing retainer or housing 3.

In order to damp vibrations and control the speed at which resonance is produced by the rotating shaft 1, the bearing housing 3 is elastically and concentrically mounted in a stationary supporting housing 4 with vibration damping. More particularly, the bearing housing 3 is mounted in the stationary housing 4 by an elastic member comprised of axial rods 5 whose opposite ends are respectively secured to the housings 3 and 4. The rods 5 are concentrically arranged around the shaft 1 and due to its cage-like appearance, the rods 5 are referred to as a "squirrel cage".

The outer circumferential surface of bearing housing 3 forms a narrow space 6 with the inner circumferential surface of the stationary housing 4 into which a viscous liquid, such as oil is introduced under pressure to form an oil squeeze film in the space 6. The squeeze film dampens vibration of the bearing housing caused by the rotation of rotor shaft 1 and takes the resonant frequency of the rotating mass far out of the range of the operating speed of the rotor shaft. The space 6 has an axial length L determined by axially spaced sealing rings 10, and radial dimension W of between 150 and 250 μm.

The oil squeeze film that is formed during operation in oil space 6, not only produces vibration damping of rotor shaft 1 but also increases the resonant speed as explained above. The oil in space 6 provides a thermal separation between rotor shaft 1 and housing 4, since a continuous oil flow takes place therein from an oil inlet bore or channel 7 to oil discharge bores or channels 8a and 8b. The axial length L of space 6 is defined by two sealing rings 10 sealed in annular cavities 9 in the outer periphery of housing 3 and axially spaced from one another. The two sealing rings 10 seal the oil space 6. The sealing rings 10 act as pistons in the cavities and are applied in a sealing manner on the one hand to housing 4 and on the other hand to the radially extending shoulder 11 of annular cavity 9. Each of the annular cavities 9 extends over the entire periphery of housing 3 and each is provided with a respective oil discharge bore or channel 8a or 8b at the bottom of the cavity 9.

At the inlet side, the oil is supplied under pressure through the oil inlet bore 7 and the oil flows into space 6. The bore 7 is located midway between annular cavities 9. A peripheral groove 13 is formed in housing 3 opposite inlet bore 7 so that the oil can be transported from the oil inlet bore 7 over the entire periphery of oil space 6. The advantage of arranging the inlet bore 7 in the center of oil space 6 is that a uniform, almost constant static pressure distribution is established at both sides of oil inlet bore 7 in the oil space 6. If an asymmetric pressure distribution should be desired for particular reasons with respect to a dynamic pressure distribution, then an off center arrangement of the oil inlet bore 7 may be appropriate, so that, for example, it can operate with an eccentric position of rotor 1. Although the oil inlet and oil discharge bores 7, 8a and 8b have been shown in the same line for purposes of simplicity in the drawing, in actuality the inlet bore 7 and the discharge bores 8a, 8b are angularly offset by 180° so as to be diametrically opposed to one another. In this way, it is assured that the oil squeeze film will be as uniform as possible over the entire periphery of the oil space 6 over its entire axial length.

In accordance with the invention, the discharge bores 8a and 8b are provided with respective constricted regions 14b and 14c in order to assure continued formation of the oil squeeze film under dynamic conditions, the determining factor for the oil throughout in oil space 6 and thus for the damping effect of the oil film. These constrictions are the determining factor for the oil throughput in oil space 6 and thus for the damping effect of the oil film. A constriction 14a is also provided in oil inlet bore 7 to limit leakage in the event of a loss of sealing of the oil space 6. Constrictions 14a, b, c are adapted to each other as regards their length and their flow cross-section i.e. their respective diameters $d_A$ or $d_E$, such that the oil discharge bores 8a and 8b operate as a choke or throttle. Thus, the diameter $d_A$ in constriction 14a is greater by $\sqrt{3}$ times than the constrictions 14b, c in oil discharge bores 8a or 8b. In the apparatus of the invention, the oil flow quantity can be established by varying the length L of the constricted regions 14b and 14c such that uniform or different damping degrees can be obtained. In order to assure a precise damping and through-flow quantity, the bores 7, 8a and 8b with the constricted regions 14a, b, c open directly into oil space 6 or into annular cavities 9. Further, the length LE of the constricted regions in the oil discharge bores 8a, b is limited to 3 times the diameter $d_E$. In order to limit the influence of the axial space 15 formed between the sealing rings 10 and the annular cavities 9 relative to damping behavior, the length a of cavities 15 is between 50 and 75%, and preferably approximately 60% of the diameter $d_E$ of oil discharge bores 8a, b.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. Apparatus for vibration damping a rotatable shaft supported by a bearing assembly in a stationary support housing, the bearing assembly having a bearing housing which is elastically mounted concentrically within the stationary housing in an axial position therein, said bearing housing and said support housing having opposed circumferential surfaces forming a space, the stationary housing having an inlet bore therein extending to said space for introduction of a viscous liquid under pressure into said space, said bearing housing having axially spaced discharge bores extending from said space on opposite sides of said inlet bore in the stationary housing for discharge of the viscous liquid from said space, sealing rings being provided in the bearing housing to seal ends of said space, the improvement wherein said discharge bores in said bearing housing have constricted regions therein in the vicinity of said sealing rings, said constricted regions each having a flow cross-section and length related to the flow cross-section of the inlet bore in the stationary housing to constitute a choke.

2. The improvement as claimed in claim 1, wherein said inlet bore in said stationary housing is located axially midway between the discharge bores in the bearing housing.

3. The improvement as claimed in claim 1, wherein said bearing housing has annular cavities in which said sealing rings are disposed, said discharge bores in said bearing housing being connected to said cavities.

4. The improvement as claimed in claim 3, wherein said discharge bores in the bearing housing open directly into said annular cavities.

5. The improvement as claimed in claim 3, wherein said sealing rings form axial spaces in said annular cavities, said axial spaces having an axial length which is 50 to 75% of the diameter of the constricted regions in the discharge bores in the bearing housing.

6. The improvement as claimed in claim 1, wherein said inlet bore in the stationary housing is angularly offset by 180° from the discharge bores in the bearing housing so as to be in diametric opposition therewith.

7. The improvement as claimed in claim 1, wherein said inlet bore in said stationary housing also has a constricted region therein, said constricted region in the inlet bore having a diameter equal to at least $\sqrt{3}$ times the diameter of the constricted regions in the bores in the bearing housing.

8. The improvement as claimed in claim 1, wherein the length of the constricted region of each of said discharge bores in the bearing housing is not more than 3 times the diameter of the constricted region.

9. The improvement as claimed in claim 1, wherein said bearing housing has a peripheral groove therein which faces said inlet bore in the stationary housing.

* * * * *